US011875259B1

United States Patent
Li et al.

(10) Patent No.: US 11,875,259 B1
(45) Date of Patent: Jan. 16, 2024

(54) GENERATIVE SYSTEM AND METHOD FOR ENHANCING READABILITY OF BARCODES USING FREQUENCY GUIDED COMPUTER VISION

(71) Applicant: Socure, Inc., Tahoe Village, NV (US)

(72) Inventors: Edward Li, Tahoe Village, NV (US); Hayden Edelson, Tahoe Village, NV (US); Badri Nagabandi, Tahoe Village, NV (US); Feng Xiao, Tahoe Village, NV (US); Eric Levine, Tahoe Village, NV (US); Pablo Ysrrael Abreu, Miami Beach, FL (US)

(73) Assignee: Socure, Inc., Incline Village, NV (US)

( * ) Notice: Subject to any disclaimer, the term of this patent is extended or adjusted under 35 U.S.C. 154(b) by 0 days.

(21) Appl. No.: 18/376,667

(22) Filed: Oct. 4, 2023

(51) Int. Cl.
*G06N 3/08* (2023.01)
*G06K 7/14* (2006.01)

(52) U.S. Cl.
CPC .............. *G06N 3/08* (2013.01); *G06K 7/1413* (2013.01)

(58) Field of Classification Search
None
See application file for complete search history.

(56) References Cited

U.S. PATENT DOCUMENTS

| | | | |
|---|---|---|---|
| 7,287,698 B2 * | 10/2007 | Barrus | G06K 17/0016 235/462.15 |
| 2007/0246542 A1 * | 10/2007 | Manheim | G06K 5/00 235/487 |
| 2022/0309264 A1 * | 9/2022 | Yang | G06K 7/1413 |

* cited by examiner

*Primary Examiner* — Kristy A Haupt
(74) *Attorney, Agent, or Firm* — Charles B. Lobsenz; Potomac Law Group, PLLC (57) ABSTRACT

Provided is a system and methodology which enhances the readability of barcodes using machine learning techniques wherein a model is trained using exemplary data and the resulting model is used in production to increase the chances of successfully capturing the data in a barcode notwithstanding that the barcode may be of low quality. According to the teachings of the present invention, the system is trained using large quantities of synthetic personal information associated with barcodes. Once the system is placed into production, the trained model is applied as against newly identified barcodes to enhance the readability of the original barcode based on features associated with the trained model.

19 Claims, 4 Drawing Sheets

GENERATIVE SYSTEM AND METHOD FOR ENHANCING READABILITY OF BARCODES USING FREQUENCY GUIDED COMPUTER VISION

FIELD OF THE DISCLOSURE

Disclosed embodiments relate to barcodes and the reading thereof, and more specifically, to the use of machine learning systems to detect and enhance low quality barcodes to increase the probability of success in reading such barcodes.

BACKGROUND

Barcodes are widely used in many industries and applications. In connection with the reading of such barcodes, it is desirable to have a clear and high quality barcode image so that a reader can capture the information embedded in the barcode. Unfortunately, barcode images are often of lower quality to the point that some are unreadable by known barcode readers. This may occur for various reasons including, for example, poor quality printing when the barcode is originally generated/affixed to the product, damage to the packaging or other item on which the barcode is printed and/or deterioration of the image over time due to environmental and other factors.

Barcodes are often used in connection with identity verification solutions wherein valid identities are verified and invalid identities are recognized. These solutions may also be implemented in connection with many different applications to prevent fraud attacks. Barcodes (e.g. from a driver's license) may be used by identity verification solutions to verify identity prior to allowing a transaction or other process to proceed. If the barcode is unreadable, the overall process is at best compromised, or at worst, unable to proceed even though, in reality, the proposed transaction is not fraudulent.

Thus, as will be understood, there is a need for a system and methodology in which barcodes can be read to obtain the associated data embedded in the barcode even when the barcode is of low quality or would otherwise be unreadable.

SUMMARY OF THE INVENTION

It is to be understood that both the following summary and the detailed description are exemplary and explanatory and are intended to provide further explanation of the present embodiments as claimed. Neither the summary nor the description that follows is intended to define or limit the scope of the present embodiments to the particular features mentioned in the summary or in the description. Rather, the scope of the present embodiments is defined by the appended claims.

Embodiments may include a method and system which enhances the readability of barcodes using machine learning techniques wherein a model is trained using exemplary data and the resulting model is used in production to increase the chances of successfully capturing the data in a barcode notwithstanding that the barcode may be of low quality.

The system and methodology of the present invention, in some embodiments, may employ an object detection convolutional neural network algorithm to detect and localize a barcode on an original image such as a driver's license, product package or any other image or physical object containing the barcode.

In various embodiments of the present invention, once the barcode is localized and identified, it can then be cropped from the remainder of the image or item and be used as one input to the system of the present invention wherein that cropped barcode is processed to generate an enhanced barcode which is significantly more likely to be readable than the original barcode.

According to the teachings of the present invention, the system is trained using large quantities of synthetic personal information associated with barcodes. Once the system is placed into production, the trained model is applied as against newly identified barcodes to enhance the readability of the original barcode based on features associated with the trained model.

In some embodiments of the present invention, barcodes associated with, for example, driver's licenses, which may be of low quality may be enhanced by the trained model and then read. Once read, the information acquired from the barcode may be used in connection with various identity verification solutions, document verification operations as well as fraud detection systems in order to make determinations with respect to whether transactions and/or other processes should be allowed to proceed given the information obtained from the barcode.

DETAILED DESCRIPTION OF THE INVENTION

The present disclosure will now be described in terms of various exemplary embodiments. This specification discloses one or more embodiments that incorporate features of the present embodiments. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. The skilled artisan will appreciate that a particular feature, structure, or characteristic described in connection with one embodiment is not necessarily limited to that embodiment but typically has relevance and applicability to one or more other embodiments.

In the several figures, like reference numerals may be used for like elements having like functions even in different drawings. The embodiments described, and their detailed construction and elements, are merely provided to assist in a comprehensive understanding of the present embodiments. Thus, it is apparent that the present embodiments can be carried out in a variety of ways, and does not require any of the specific features described herein. Also, well-known functions or constructions are not described in detail since they would obscure the present embodiments with unnecessary detail.

The description is not to be taken in a limiting sense, but is made merely for the purpose of illustrating the general principles of the present embodiments, since the scope of the present embodiments are best defined by the appended claims.

It should also be noted that in some alternative implementations, the blocks in a flowchart, the communications in a sequence-diagram, the states in a state-diagram, etc., may occur out of the orders illustrated in the figures. That is, the illustrated orders of the blocks/communications/states are not intended to be limiting. Rather, the illustrated blocks/communications/states may be reordered into any suitable order, and some of the blocks/communications/states could occur simultaneously.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

The word "exemplary" is used herein to mean "serving as an example, instance, or illustration." Any embodiment described herein as "exemplary" is not necessarily to be construed as preferred or advantageous over other embodiments. Additionally, all embodiments described herein should be considered exemplary unless otherwise stated.

Aspects of the present disclosure are directed to barcode enhancement systems and methodologies. In preferred embodiments, the methodology calls for first training the system to most effectively enhance barcodes and then, following training of the system, the system is deployed in production to enhance barcodes such that barcodes that would otherwise be unreadable become readable. In some embodiments, training of the system continues in production as additional barcodes are scanned and enhancement is performed. Machine learning techniques are employed in order to train to system to be as effective as possible. In some embodiments, barcode reading and enhancement is performed in connection with identity verification, document verification and/or fraud detection solutions.

Figure 1:
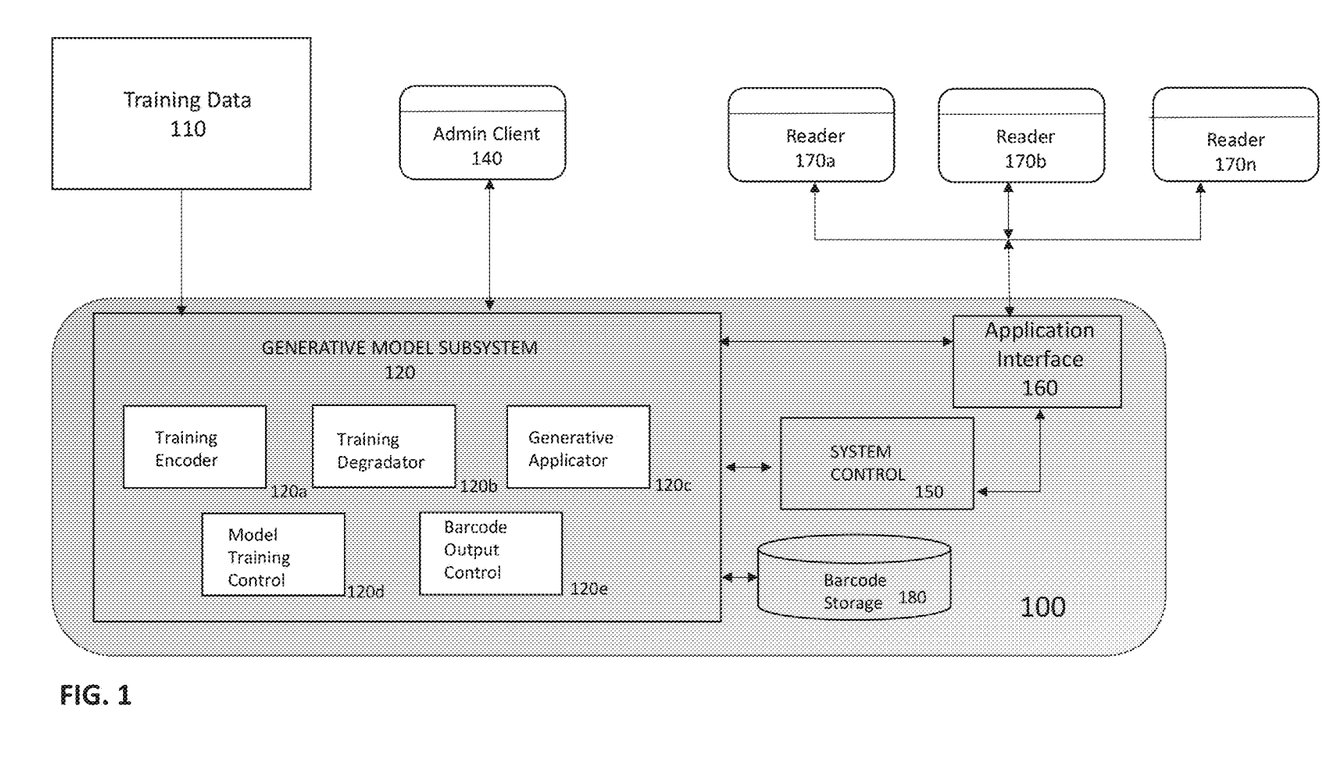
FIG. 1 is a diagram depicting the major components of the system of the present invention, including various elements with which the system of the present invention may interact, in preferred embodiments thereof.

Referring now to FIG. 1, there is illustrated a Barcode Enhancement System (BES) 100 according to one or more embodiments herein. BES 100 may reside on a single cloud based server although it is also possible for various components of BES 100 (as described herein) to reside on separate servers. By way of example, BES 100 may be a computer implemented application which resides on a computing server. As will be apparent from the discussion herein, BES 100 may include and/or implement all appropriate software and/or hardware for carrying out its barcode enhancement and related capabilities. Operation of BES 100 is under the control of system control 150.

BES 100 preferably includes Generative Model Subsystem (GMS) 120, which itself is comprised of a number of modules as discussed further herein. GMS 120 operates to enhance barcodes read into BES 100 following training of GMS 120 as more fully described herein. Barcodes are scanned into BES 100 through readers 170a, 170b . . . 170n which communicate with BES 100 via application interface 160. Application interface 160 may comprise one or more application programming interfaces (APIs) that permit applications associated with readers 170 to communicate with BES 100.

Barcode readers 170 may be one of many known devices currently available for the purpose of scanning barcodes or other coded images. Examples of coded images which fall within the scope and spirit of the present invention include barcodes such UPC and EAN codes as well as PDF417, Code 128 and data matrix barcodes as well as other forms of standardized and non-standardized barcodes. In addition, quick response (QR) codes may be processed according to the teachings of the present invention and in connection with the systems and methodologies described herein. Barcode readers 170 are used to read and capture the information contained in the barcode. Barcode readers 170 may communicate with BES 100 via a wired connection or wirelessly. Alternatively, barcode readers 170 may communicate with a hub (through a wired or wireless connection) and the hub in turn communicates with BES via the Internet or some other public or private network. Examples of barcode readers 170 which may be used in connection with the systems and methodologies of the present invention include pen wands, slot scanners, CCD scanners, image scanners and laser scanners as well as other devices capable of scanning in a coded image.

BES 100 may be accessed, in some embodiments, by an administrative client 140 for the purpose of administrating the operation of the BES 100 including how and when training is performed as well as various operational aspects associated with the handling of barcodes as they are provided to BES 100 via readers 170 for the purpose of enhancement. Admin client 140 may comprise a personal computer, a laptop, a handheld computing device such as a smartphone or a tablet or any other similar device.

Upon completion of the barcode enhancement operations of BES 100, the data read from the barcode after being enhanced by BES 100 is returned, in some embodiments, to readers 170 for further processing. In alternative embodiments, the captured data may be instead or in addition further processed by BES 100 and or transmitted directly to another system, such as a system implementing identity verification and/or fraud detection solutions, for example.

As will be further detailed in the present description, training data 110 may be provided to BES 100, and GMS 120 in particular, in order to train GMS 120 to most effectively enhance otherwise unreadable barcodes to make them readable. In some embodiments, captured barcodes which are unenhanced may be stored in barcode storage 180. In some embodiments, barcode storage may alternatively or in addition store barcodes which have been enhanced as well as other barcodes generated during the operation of GMS 120 in enhancing barcodes according to the teachings of the present invention. These barcodes may, in some embodiments, be used in connection with the initial and/or ongoing training of GMS 120.

Returning now to the specific components of BES 100, BES 100 may include various components for training itself as well as enhancing barcodes to increase the likelihood that lower quality barcodes in the wild can be scanned and the information contained within the barcode can be properly captured despite the low quality of the code image.

BES 100 may reside on one or more physical servers. These servers may include electronic storage, one or more processors, and/or other components. The servers may also include communication lines, or ports to enable the exchange of information with a network and/or other computing platforms. The servers may include a plurality of hardware, software, and/or firmware components operating together to provide the functionality attributed herein to BES 100.

Electronic storage associated with the servers may comprise non-transitory storage media that electronically stores information. The electronic storage media of electronic storage may include one or both of system storage that is provided integrally (i.e., substantially non-removable) with servers and/or removable storage that is removably connectable to the servers via, for example, a port or a drive.

Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage may include one or more virtual storage resources (e.g., cloud storage, a virtual private network, and/or other virtual storage resources). Electronic storage may store software algorithms, information determined by processors, information received from servers, information received from readers 170 and admin client 140 as well as training data 110, and/or other information that enables the servers to function as described herein.

While an exemplary architecture is described above, it will readily be understood by one of skill in the art, that an unlimited number of architectures and computing environments are possible while still remaining within the scope and spirit of the present embodiments.

Returning now to the specific components of Generative Model Subsystem (GMS) 120 shown in FIG. 1, GMS 120 includes various components which are described hereinbelow. Operation(s) of each of these components will be described at a high level now and then in further detail later in the present disclosure.

In preferred embodiments, GMS 120 includes training encoder module 120*a*. This module is responsible for taking synthetic identification data contained within training data 110 and encoding such data into a perfectly readable barcode as discussed in further detail below. In some embodiments, GMS 120 may autogenerate a very large set of synthetic data based on a base set of training data sourced from training data 110 external to system 100. Alternatively training data 110 may contain sufficient externally generated data so as to adequately initially train GMS 120. In any event, and in preferred embodiments, GMS 120 generates or has made available to it large amounts of synthetic data which such data is reflected as a large number of individual data sets each of which represents data to be contained in a single barcode. So, for example, training encoder 120*a* may use on the order of 50,000 individual data sets each of which represents an individual person and their parameters (e.g. name, date of birth, gender) and each of which is transformed into a single perfectly readable barcode to be used for training GMS 120 as more fully described herein.

The input synthetic data may comprise personal information such as names, date of birth, address, credit card information, social security number, gender, drivers' license number, etc. and/or information associated with a product such SKU number, price, quantity, product description, etc. Various other possibilities exist as well wherein any set of information and/or combinations of sets of information to be encoded and embedded within a barcode may be used.

In preferred embodiments, training degradator 120*b* component is also contained within GMS 120. Training degradator 120*b* degrades the aforementioned perfectly readable barcodes generated by training encoder 120*a*. Degradation may comprise one or more specific functional aspects including, for example, blurring, shrinking, shadowing, adding wear and tear effects etc. as more fully described below. The selection of the specific degradation techniques applied may be determined by GMS 120 under the control of a user communicating with GMS 120 via admin client 140.

As a result of the degradation techniques applied by training degradator 120*b*, a large number of degraded barcodes are available to GMS 120 in connection with the training process—these degraded barcodes having a one to one relationship with the previously generated perfectly readable barcodes generated by training encoder 120*a*. In some embodiments, the degraded barcodes are stored as intermediary results in barcode storage 180 or some other storage database available to and/or accessible by GMS 120. In preferred embodiments, the goal of the degradation process implemented by training degradator 120*b* is to generate a series of low resolution, low quality barcodes that correspond to a single perfectly readable barcode but which are not, themselves, readable.

Another component contained within GMS 120 in preferred embodiments of the present invention is generative applicator 120*c*. Generative applicator (as well as the previously mentioned components) works under the control of model training control 120*d*. Model training control manages the process of initial training of the model prior to production use and also, in some embodiments, manages the process of continued refinement of the model during production as a result of additional barcode inputs and application of machine learning techniques as further discussed herein.

Generative applicator 120*c*, in preferred embodiments of the present invention, operates to develop the model based upon the degraded barcodes generated by training degradator 120*b*. Generative applicator 120*c* uses the degraded barcodes to train the model to generate super/higher resolution barcodes from lower resolution barcodes provided as input to the model. In some embodiments generative applicator component 120*c* trains a model to function in at least two different paradigms comprising both pixel level and Fourier frequency domain modeling for similarity between the input original ground truth barcode and the barcode generated by the model which is designed to be both readable and true to the data contained in the original ground truth barcode.

Barcode output control component 120*e* is also included withing GMS 120 according to the present invention, in preferred embodiments thereof. Barcode output control 120*e* functions to generate, in a production environment, model output barcodes with a resolution and quality significantly higher than that of the input barcode. Further, these output barcodes are readable by readers 170 to allow capture of the data contained in the original barcode. In preferred embodiments, during production, upon a scan of a low quality barcode by reader 170 and under the direction of system control 150, GMS 120 implements the trained model and, in particular, barcode output control 120*e* functions to generate a readable barcode which may be transmitted back to reader 170 for reading or, alternatively, the data captured from the readable output barcode may be transmitted back to reader 170 without the need for reader 170 to do another scan. In yet another alternative, the data captured by system 100 may be communicated to another system, such as an identity verification or fraud detection system, for example, without the need for any additional processing by reader 170.

Figure 2:
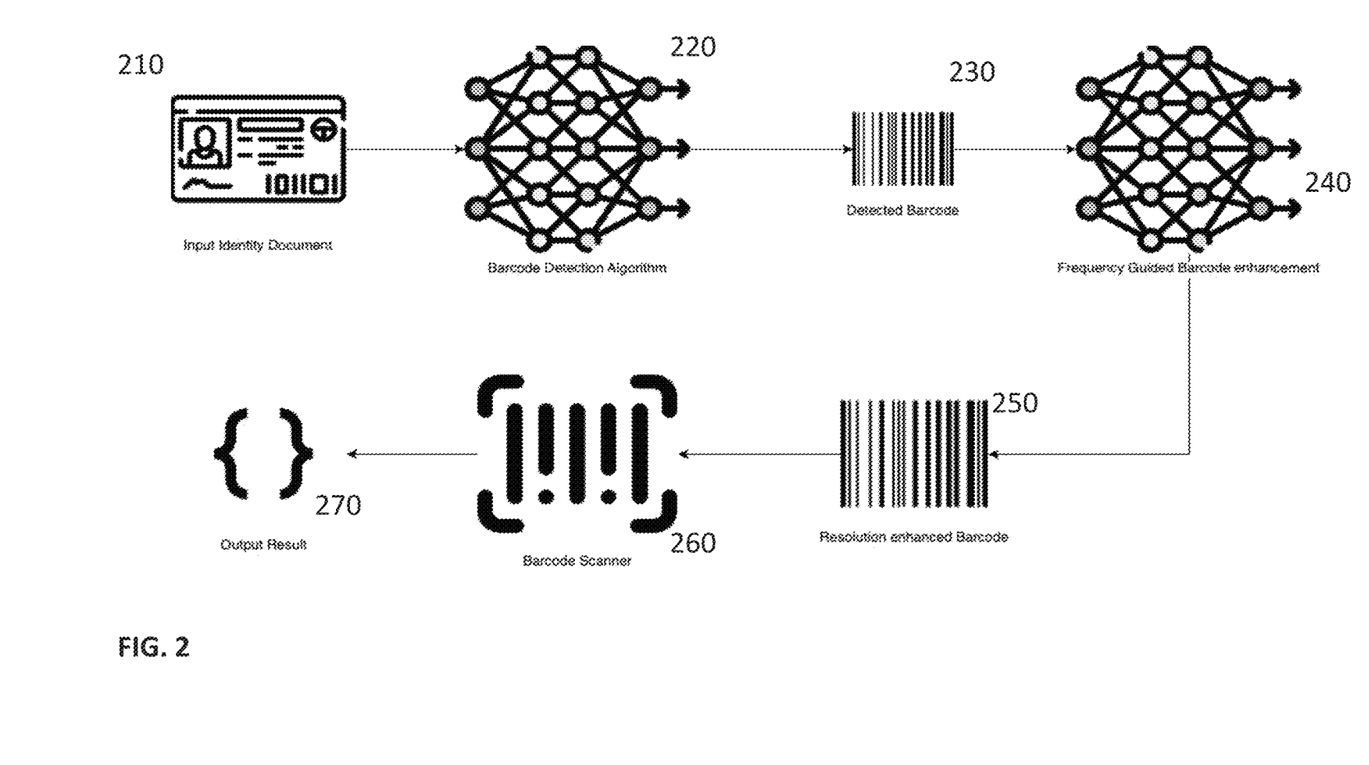
FIG. 2 is a data flow diagram illustrating the high level aspects of barcode capture and enhancement in one embodiment of the present invention.

Turning now to FIG. 2 and in connection therewith, a more detailed discussion of the overall production process and the application of the trained model to low quality barcodes in order to generate output results with accurate data, is now provided. The following discussion assumes the reading of an identity document such as a driver's license for the purpose of identity verification. One of ordinary skill in the art will readily recognize that the teachings of the present invention may be applied in many other contexts including in any case where a barcode or some other coding containing information is to be read and processed.

At step 210, a document containing a barcode such as a driver's license is read by reader 170. In preferred embodiments, system 100, and in particular, GMS 120 has been previously trained as was generally discussed above. A barcode detection algorithm is applied by system 100 at step 220 in order to detect the barcode on the driver's license. The detected barcode is isolated at step 230 and this isolated barcode is next processed by system 100 and in particular GMS 120 so as to enhance the readability of the barcode. In preferred embodiments, an object detection convolutional neural network algorithm is used to detect and localize the barcode location within the original image.

An enhanced barcode 250 is then generated by GMS 120 using the frequency guided enhancement techniques described generally above and more particularly described below. This enhanced barcode 250 can then be read by a barcode scanner at step 260 (which may be reader 170 or, alternatively, a different scanning device). Since the enhanced barcode is more likely to be readable as opposed to the original barcode isolated at step 230, the probability of obtaining the coded information contained within the isolated barcode is much more likely and the output result containing that information can be generated at step 270.

Figure 3:
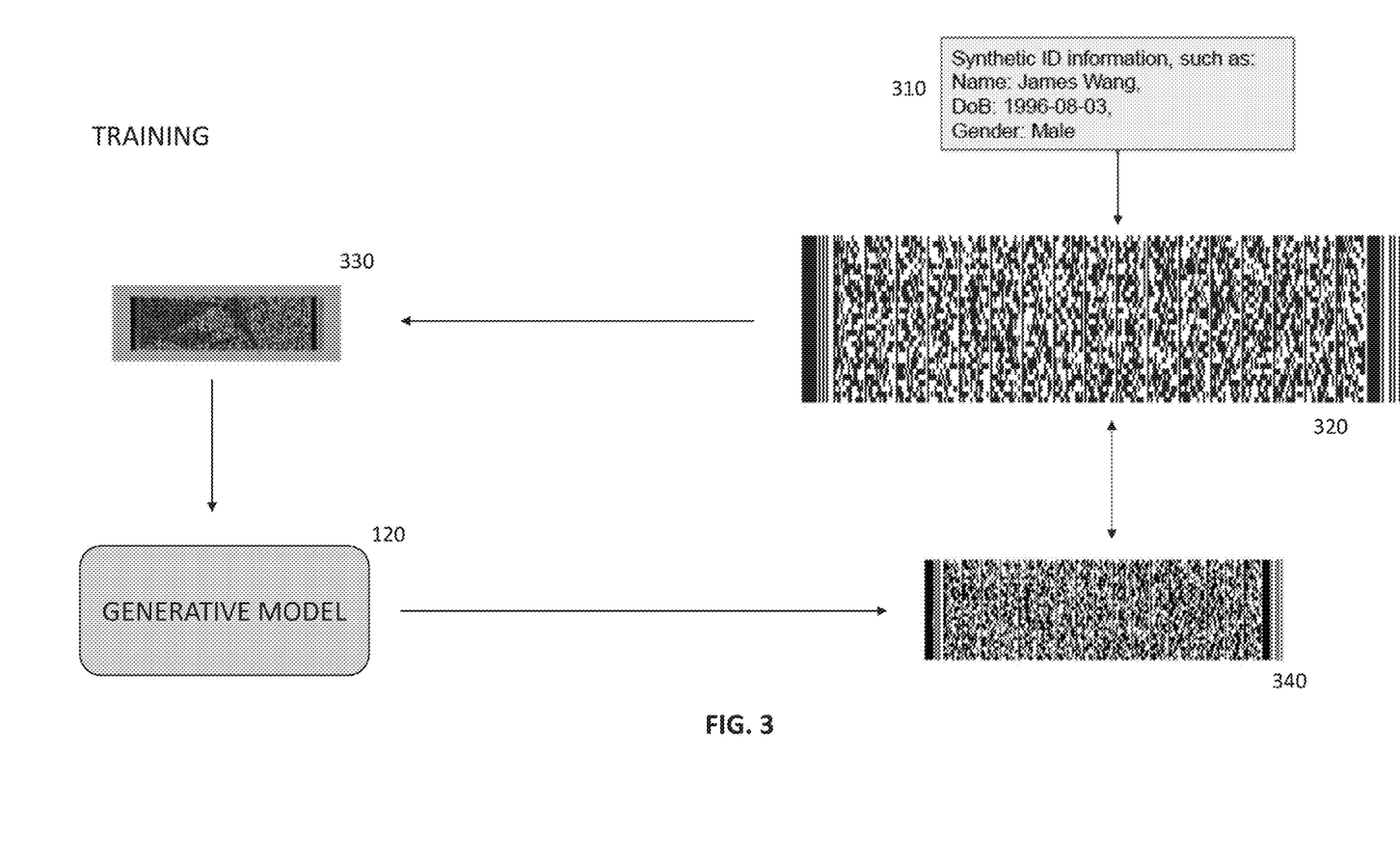
FIG. 3 is an illustration demonstrating the training aspects of the generative super resolution model of the present invention in a preferred embodiment thereof.

With reference now to FIG. 3, a more detailed description of the training process for GMS 120 is provided. In preferred embodiments, training occurs to a large part prior to placing system 100 in production but the effectiveness of the model may continue to be enhanced during the production phase using the inputs received during usage in production to continually enhance the model in order to achieve better and better results with continued usage. These enhancements and the continued betterment of the model is achieved through machine learning techniques as applied to a machine learning model.

A "machine learning model" or "model" as used herein, refers to a construct that is trained using training data to make predictions or provide probabilities for new data items, whether or not the new data items were included in the training data. For example, training data for barcoded images can include sample barcodes containing sample data. Examples of models include: neural networks (traditional, deeps, convolution neural network (CSS), recurrent neural network (RNN)), support vector machines, decision trees, decision tree forests, Parzen windows, Bayes, clustering, reinforcement learning, probability distributions, decision trees, and others. Models can be configured for various situations, data types, sources, and output formats.

GMS 120, in preferred embodiments, is trained under the control of model training control 120*d*, by providing sample data 310 which is embedded in a large number of perfectly readable barcodes 320 which are generated by training encoder 120*a*. A very large number of sample data sets encoded into perfectly readable barcodes is preferred. For example, synthetically generated records, on the order of ten thousand or more samples is preferred. These samples may be generated by GMS 120 or may be manually created, or some combination of the two. As shown in FIG. 3, an exemplary record of data that might be contained on a driver's license barcode is shown—for example, name, date of birth and gender. As will be readily apparent, other and/or additional data fields such as height, weight, social security number, driver's license number, etc. may be included.

The information in the data records 310 is transformed into a perfectly readable barcode according to a pre-determined encoding scheme (e.g. QR code, UPC code, etc.) as is known in the art. This barcode 320 is referred to as the "original" barcode and is generated and preferably stored/accessible electronically (as if it had been previously read) within GMS 120. Each of these original barcodes 320 are next degraded under the control of training degradator 120b according to pre-selected processes. For example, various combinations of processes may be applied to the original barcode in order to degrade the original barcode and to transform it into a low quality barcode 330. These processes may include, for example, down-sampling, blurring, shadowing, distorting, shrinking, applying wear and tear effects, adding background colors etc. Exemplary degradation processes include, without limitation:

Down-sampling: Down-sampling an image can be done using various algorithms such as Nearest Neighbor, Bilinear Interpolation, Bicubic Interpolation, and Lanczos Resampling.
  Blurring: Blurring an image can be done using various algorithms such as Gaussian Blur, Box Blur, and Median Blur.
  Shadowing: Adding shadows to an image can be done using algorithms such as Shadow Mapping, Shadow Volumes, and Ray Tracing.
  Distorting: Distorting an image can be done using algorithms such as Mesh Warping, Thin Plate Spline, and Image Morphing.
  Shrinking: Shrinking an image can be done using algorithms such as Seam Carving which removes the least important pixels from the image.
  Wear and Tear Effects: Adding wear and tear effects to an image can be done using algorithms such as Texture Synthesis, which generates new textures based on existing ones.
  Adding Background Colors: Adding background colors to an image can be done using algorithms such as Color Transfer, which transfers the color distribution of one image to another.

Any and all processes which virtually simulate the types of degradations that can occur to a barcode in the wild may be applied according to the teachings herein.

Each of the degraded barcodes 330, as shown in FIG. 3, is fed into the generative model under the control of generative applicator 120c. In preferred embodiments, the model is trained through the use of an image reconstruction vision transformer algorithm to up-sample and improve the spatial and frequency resolution of the degraded image 330. In preferred embodiments, the degraded barcodes 330 are processed by a SWIN transformer (shifted windows model used in connection with a convolutional neural network) in patch like fashion. In some embodiments, the model breaks down the degraded image into 8px by 8px patches before applying the first transformer layer. It is also possible to use alternative transformer architectures and/or neural networks while still remaining within the scope and sprit of the present invention.

The model then performs upscaling and removes any degradations and aberrations to generate an output image 340 which as closely as possible, matches the original synthetically generated barcode image 320. This paradigm is used further on real world production data to further improve the model performance. The training objectives are optimized to include both image level similarity such as L1 pixel distance but also semantic similarities through perceptual neural feature matching through pretrained image networks (perceptual loss) as well as frequency domain differences in both phase and amplitude. Since barcode/QR images are inherently combinations of different frequency waves in 2d of varying phase and amplitude, optimizing frequency domain similarity directly guides the network to converge on most readable inferences from a noisy and degraded input image. In preferred embodiments, Discrete Fourier Transform is used to transform barcode images into frequency domain to obtain both phases and amplitudes.

As will be understood by one of skill in the art, error correction components, for example those used by PDF417 encoding schemes, may be employed to further ensure that data is accurately represented in output image 340 even when there would otherwise be non-recoverable portions of data within a barcode image existing in the wild. These error correction components may include, for example, redundancy, check digits, start and stop patterns, error detection and correction and other similar encoding schemes to ensure that a barcode is read correctly and conveys the correct information. In addition, it is also possible, as examples of degradation techniques, to apply contrast and perspective adjustments to the barcodes in connection with the model to ensure that the model, in production, produces the most readable version of the original barcode found in the wild as is possible. In preferred embodiments, both pixel level and Fourier domain components may be employed by the model to train itself to generate enhanced barcode images 340 that are both readable and accurate as to data content when used in a production environment. In preferred embodiments, back propagation techniques such as stochastic gradient descent methods, for example, are employed to train the transformer model.

According to the teachings of the present invention, in preferred embodiments thereof, the trained model is configured to identify patterns and features in the training data to enhance the degraded barcode by generating a barcode to be as much like its original, which is as perfect a barcode as possible. Therefore, at the time of production, the model applies these learned patterns and features to examples in the wild, and generates reconstructed barcodes which are enhanced beyond what is presented by the barcode in the wild which is presented as an input to the model.

Figure 4:
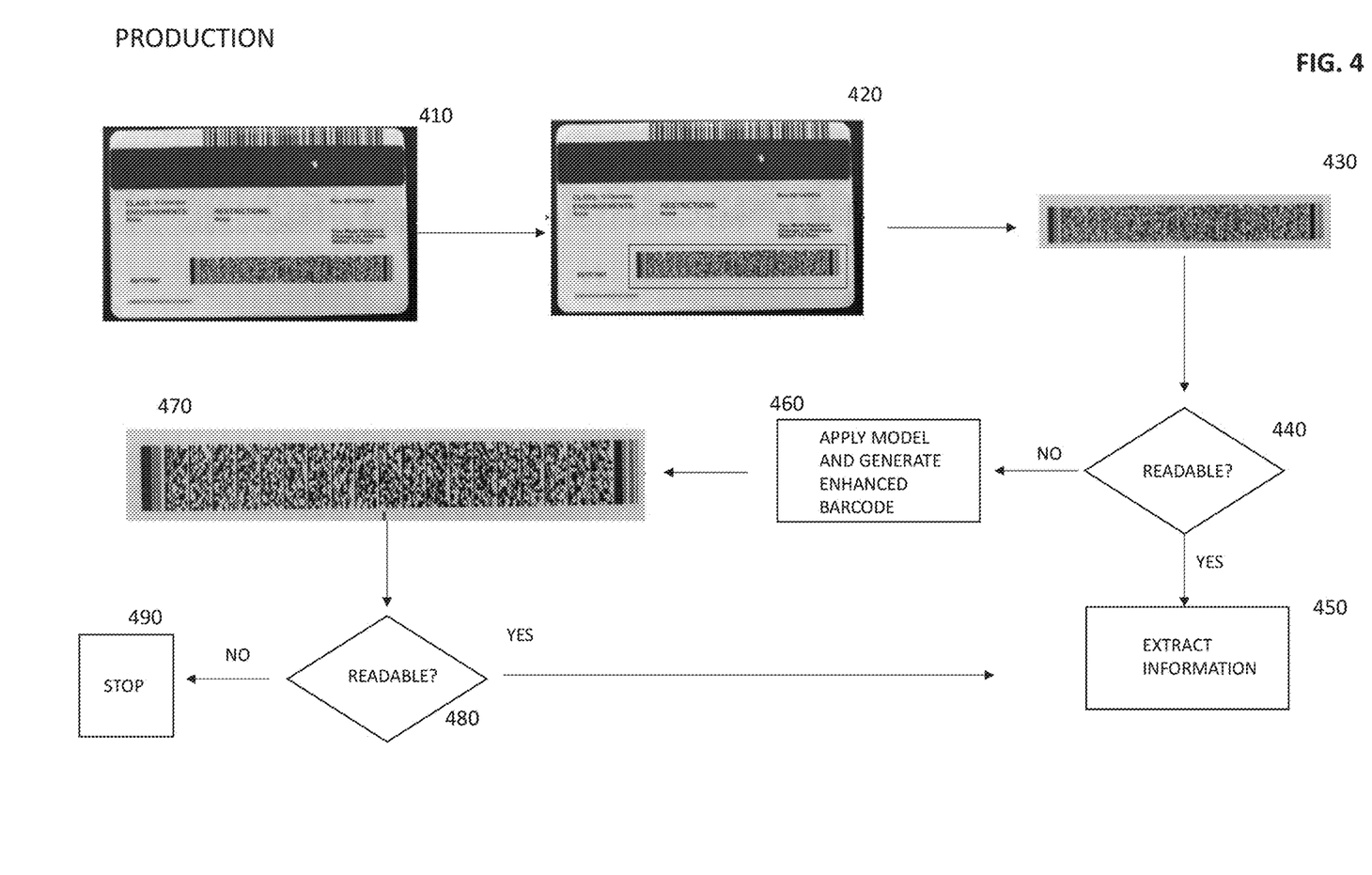
FIG. 4 is an illustration demonstrating the production aspects of present invention including enhancement of a low quality barcode image according to the teachings contained herein.

With reference now to FIG. 4, the operation of system 100 in a production environment, in preferred embodiments, is now described. In this case, GMS 120 has preferably been previously trained so that it can receive barcodes from "in the wild" via reader 170 and even though these barcodes in the wild suffer from poor image quality, they may nonetheless be processed and the desired information contained within the barcode read and processed. This is achieved through the use of the trained GMS 120 model which accepts an in the wild barcode as input and provides, as output, an enhanced barcode that is significantly more likely to be readable such that the embedded data can be read and/or processed as intended.

At step 410 an exemplary document or image containing a barcode, for example, a driver's license, is scanned by reader 170. At step 420 the barcode portion of the document or image is extracted and isolated as an original image 430 to be read so as to obtain the coded information contained within the barcode. System 100 attempts to read the original image in order to determine and possibly process the coded data contained therein. At step 440, if the data is readable as determined by system 100 (including, if applicable, confirming error coding reflects a readable image with accurate data), then the information is extracted and may then be processed by system 100 or, alternatively, passed to another system for subsequent processing of the captured data. By way of example, the coded information extracted from the barcode may represent data which is employed by a separate or integrated system for making identity verification decisions, document verification determinations and/or making assessments as to whether a proposed action or transaction is likely to be fraudulent.

In the case, at step 440, where the extracted barcode 430 is not readable as determined by system 100, processing continues at step 460 wherein the extracted barcode 430 is passed as an input to the trained model contained within GMS 120 for the generation of an enhanced barcode 470. This enhanced barcode 470 is generated by the GMS 120 model as a result of previous training wherein degraded barcodes are mapped to enhanced barcodes based on previous training and wherein the model has learned to generate enhanced barcodes 470 that are as close a match to the original degraded image in both the pixel and Fourier domains as possible while also being significantly more likely to be readable than the original degraded image appearing in the wild.

In some embodiments of the present invention, GMS 120 may continually train to enhance performance even during operation in production. In this case, the mapping between the originally extracted barcode 430 and the enhanced barcode 470 generated by GMS 120 can be analyzed both in terms of readability as well as consistency in the pixel and Fourier (frequency) domains to assess improve the model on an iterative basis as operation in production continues.

At step 480, system 100 determines whether or not the enhanced barcode image 470 is readable. If it is, processing continues to step 450 where the information is extracted and processed as noted above. Alternatively, if the enhanced barcode 470 is unreadable as determined by system 100 (possibly due to an error correction based error), then processing stops and the original barcode contained in document 410 is reported as unreadable. In alternative embodiments, however, if the enhanced barcode 470 is determined to be unreadable at step 480 it is possible to use the enhanced barcode 470 as an input to the processing flow in place of 430 and attempt one or more secondary enhancements to see if that eventually results in a readable barcode image with extractable data. This alternative embodiment is largely dependent upon the availability of the necessary processing power, system memory and the nature of the encoded information as well as other factors.

The present embodiments are not limited to the particular embodiments illustrated in the drawings and described above in detail. Those skilled in the art will recognize that other arrangements could be devised. The present embodiments encompass every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application While the present embodiments have been described with reference to specific illustrative embodiments, modifications and variations of the present embodiments may be constructed without departing from the spirit and scope of the present embodiments as set forth in the following claims.

While the present embodiments have been described in the context of the embodiments explicitly discussed herein, those skilled in the art will appreciate that the present embodiments are capable of being implemented and distributed in the form of a computer-usable medium (in a variety of forms) containing computer-executable instructions, and that the present embodiments apply equally regardless of the particular type of computer-usable medium which is used to carry out the distribution. An exemplary computer-usable medium is coupled to a computer such the computer can read information including the computer-executable instructions therefrom, and (optionally) write information thereto. Alternatively, the computer-usable medium may be integral to the computer. When the computer-executable instructions are loaded into and executed by the computer, the computer becomes an apparatus for practicing the embodiments. For example, when the computer-executable instructions are loaded into and executed by a general-purpose computer, the general-purpose computer becomes configured thereby into a special-purpose computer. Examples of suitable computer-usable media include: volatile memory such as random access memory (RAM); nonvolatile, hard-coded or programmable-type media such as read only memories (ROMs) or erasable, electrically programmable read only memories (EEPROMs); recordable-type and/or re-recordable media such as floppy disks, hard disk drives, compact discs (CDs), digital versatile discs (DVDs), etc.; and transmission-type media, e.g., digital and/or analog communications links such as those based on electrical-current conductors, light conductors and/or electromagnetic radiation.

Although the present embodiments have been described in detail, those skilled in the art will understand that various changes, substitutions, variations, enhancements, nuances, gradations, lesser forms, alterations, revisions, improvements and knock-offs of the embodiments disclosed herein may be made without departing from the spirit and scope of the embodiments in their broadest form.

What is claimed is:

1. A method of enhancing an original barcode contained within an original image document, the method comprising:
   reading the original image document;
   isolating the original barcode;
   determining whether said original barcode is readable;
   if said original image barcode is not readable, applying a trained generative model to said original image barcode to generate an enhanced barcode; and
   extracting the information contained in said enhanced barcode.

2. The method of claim 1, wherein said information extracted from said enhanced barcode corresponds to the information contained within said original barcode.

3. The method of claim 1, wherein if the original barcode is readable prior to said step of applying said trained generative model, the information contained in said original barcode is extracted.

4. The method of claim 1, wherein said trained generative model is trained using synthetic personal information associated with sample barcodes.

5. The method of claim 4, wherein said sample barcodes are generated to be perfectly readable and contain said associated synthetic personal information.

6. The method of claim 5, wherein said sample barcodes are degraded in connection with the said training of said trained generative model.

7. The method of claim 1, further comprising the step of employing said extracted information in connection with an identity verification determination.

8. The method of claim 1, further comprising the step of employing said extracted information in connection with a fraud assessment determination.

9. A method of training a generative model wherein said generative model is employed for the purpose of enhancing barcodes, the method comprising:
receiving synthetic identification data;
encoding said synthetic identification data into a perfectly readable barcode;
degrading said perfectly readable barcode into a low quality barcode;
configuring said generative model to transform said low quality barcode into an enhanced barcode, wherein said enhanced barcode is readable to extract said synthetic identification data.

10. The method of claim 9, wherein said step of degrading said perfectly readable barcode comprises shrinking the size of said perfectly readable barcode.

11. The method of claim 9, wherein said step of degrading said perfectly readable barcode comprises blurring said perfectly readable barcode.

12. The method of claim 9, wherein said step of configuring said generative model comprises inputting said low quality barcode into a SWIN transformer.

13. The method of claim 12, wherein said inputting comprises the use of 8×8 patches.

14. The method of claim 9, wherein said step of configuring said generative model comprises optimizing frequency domain similarity between said perfectly readable barcode and said enhanced barcode.

15. The method of claim 9, wherein said step of configuring said generative model comprises optimizing pixel level similarity between said perfectly readable barcode and said enhanced barcode.

16. A computing system for enhancing barcodes to make them readable, the computing system comprising:
one or more processors;
one or more memories storing instructions that, when executed by the one or more processors, cause the computing system to perform a process comprising:
reading the original image document;
isolating the original barcode;
determining whether said original barcode is readable;
if said original image barcode is not readable, applying a trained generative model to said original image barcode to generate an enhanced barcode; and
extracting the information contained in said enhanced barcode.

17. A system configured to train a generative model to enhance barcodes, the system comprising:
one or more processors configured to execute computer program modules, and a physical storage capability;
a training computer program module operative to train a model to enhance barcodes;
a barcode isolator computer program module operative to isolate a barcode from an image;
a model application computer program module operative to take said isolated barcode as input and generate an enhanced barcode as an output wherein:
said model application computer program module is trained according to a process comprising the steps of:
receiving synthetic identification data;
encoding said synthetic identification data into a perfectly readable barcode;
degrading said perfectly readable barcode into a low quality barcode;
configuring said model application computer program module to transform said low quality barcode into an enhanced barcode, wherein said enhanced barcode is readable to extract said synthetic identification data.

18. The system of claim 17, further comprising an identity verification functionality using data extracted from said enhanced barcode.

19. The system of claim 17, further comprising a fraud detection functionality using data extracted from said enhanced barcode.

* * * * *